J. F. SCHILLER.
BLOW-OFF VALVE FOR STEAM BOILERS.
APPLICATION FILED OCT. 3, 1911.
1,044,259. Patented Nov. 12, 1912.
3 SHEETS—SHEET 1.
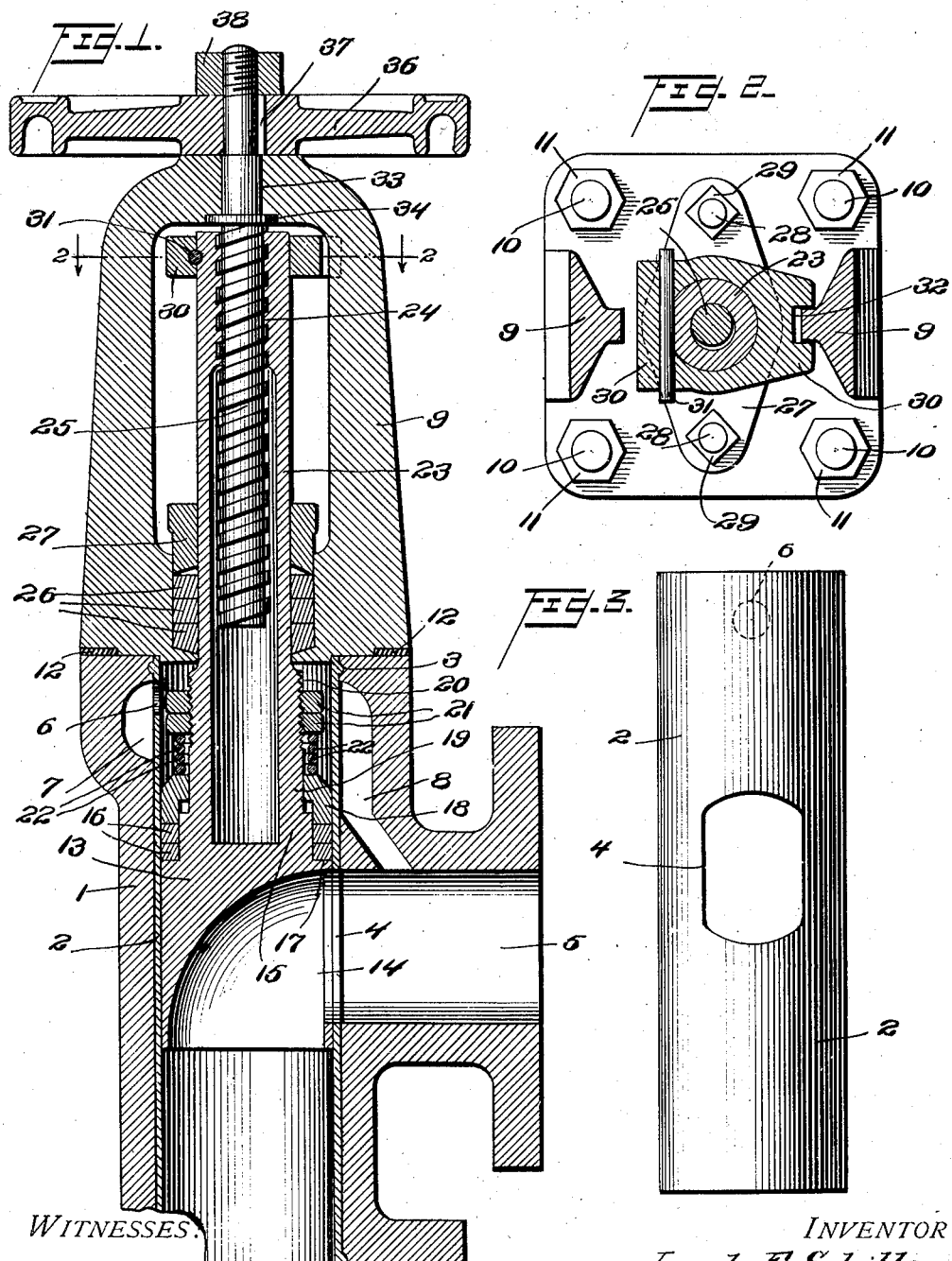
WITNESSES.
O. H. Strauss
R. H. Krenkel.
INVENTOR
Joseph F. Schiller
BY
Joshua R. H. Potts
Attorney

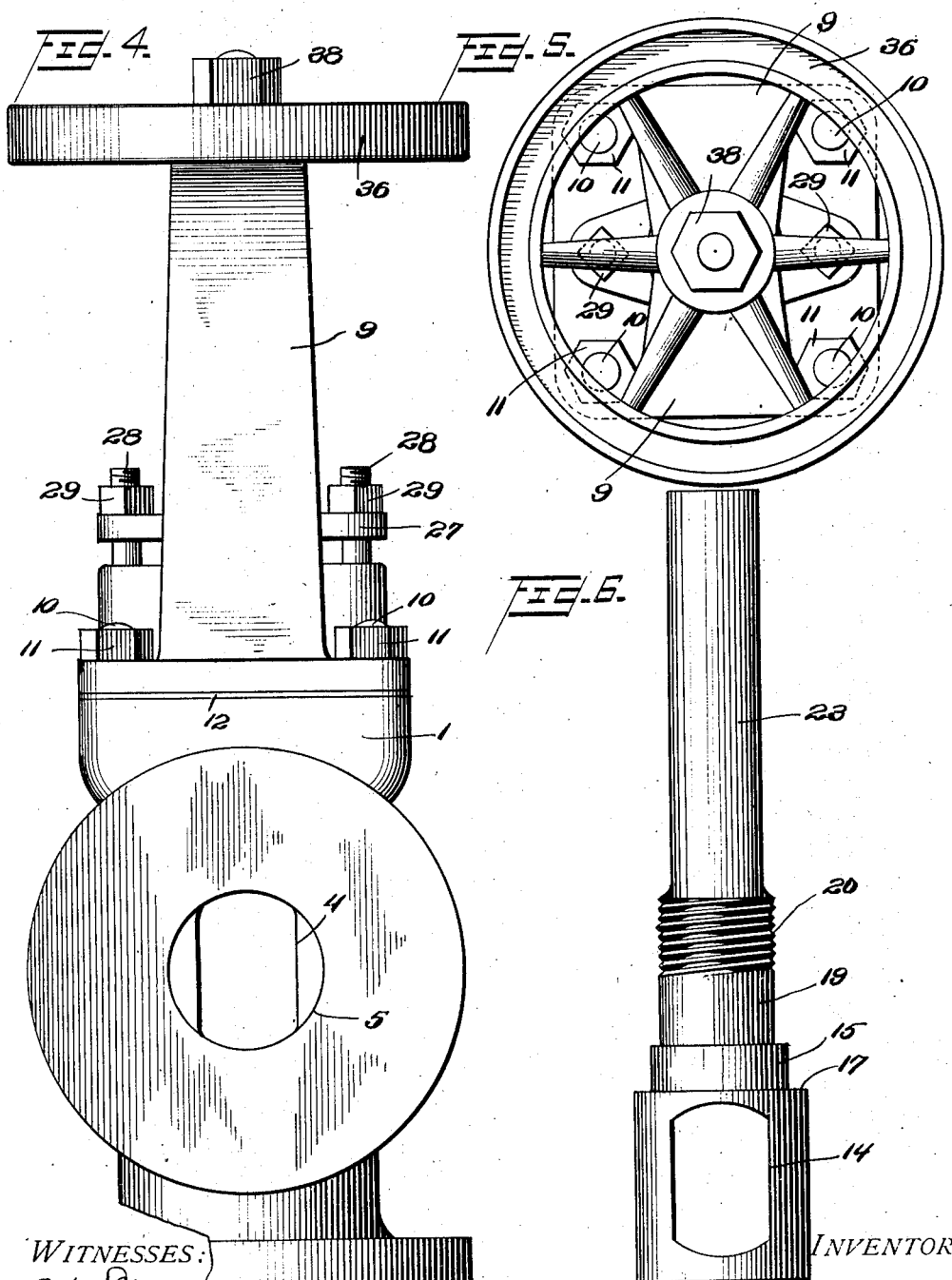

J. F. SCHILLER.
BLOW-OFF VALVE FOR STEAM BOILERS.
APPLICATION FILED OCT. 3, 1911.
1,044,259.
Patented Nov. 12, 1912.
3 SHEETS—SHEET 3.
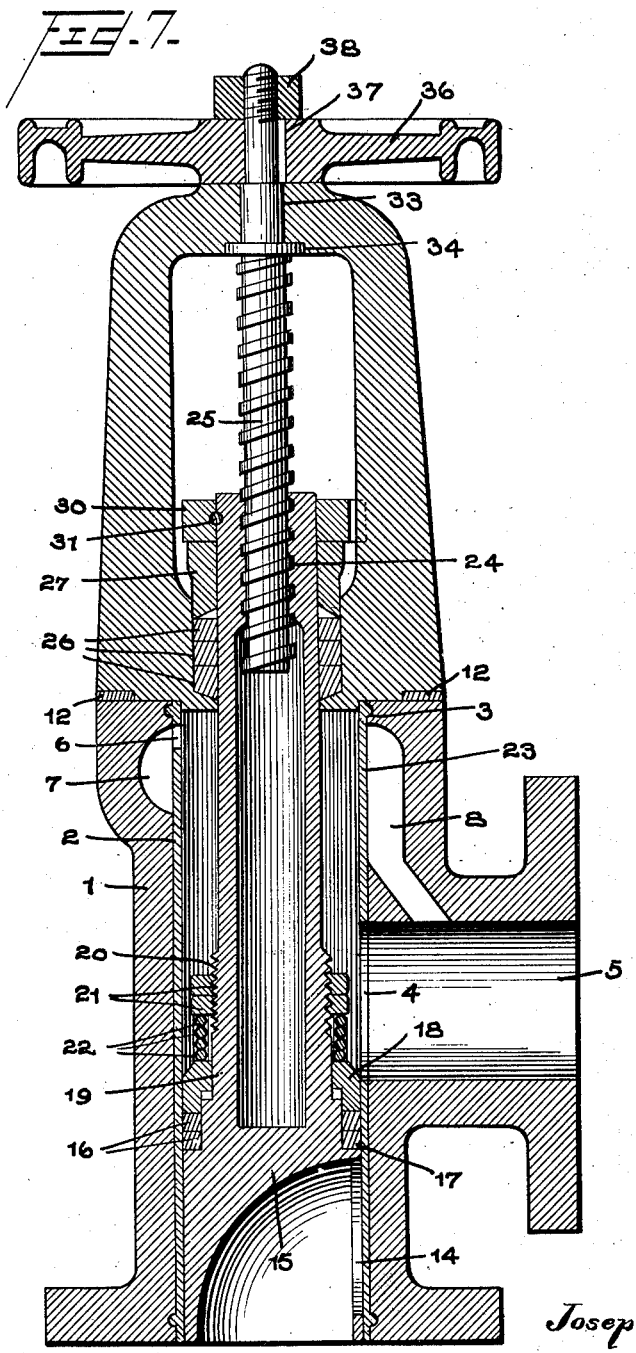

UNITED STATES PATENT OFFICE.

JOSEPH F. SCHILLER, OF PHILADELPHIA, PENNSYLVANIA.

BLOW-OFF VALVE FOR STEAM-BOILERS.

1,044,259.  Specification of Letters Patent.  Patented Nov. 12, 1912.

Application filed October 3, 1911. Serial No. 652,508.

*To all whom it may concern:*

Be it known that I, JOSEPH F. SCHILLER, a citizen of the United States, residing at Philadelphia, in the county of Philadelphia and State of Pennsylvania, have invented certain new and useful Improvements in Blow-Off Valves for Steam-Boilers, of which the following is a specification.

My invention relates to improvements in blow off valves for steam boilers, and more particularly to piston valves of this type, the primary object of the invention being to provide a valve which will be absolutely tight, and which is so constructed as to permit a circulation of water to opposite sides of the valve, so as to render it perfectly balanced, and enable its manipulation without excessive labor.

A further object is to provide a valve of this character which embodies features of novelty and of advantage in its construction, in that it is steam tight, is easily operated, is simple in construction, is strong and durable in use, and overcomes the defects of valves of this character in general use.

With these and other objects in view, the invention consists in certain novel features of construction and combinations and arrangements of parts, as will be more fully hereinafter described and pointed out in the claims.

In the accompanying drawings: Figure 1, is a view in longitudinal section illustrating my improvements. Fig. 2, is a view in cross section on the line 2—2 of Fig. 1. Fig. 3, is a view in elevation of the seamless brass tubing or bushing 2. Fig. 4, is a view in side elevation taken at right angles to Fig. 1. Fig. 5, is a top plan view of Fig. 4. Fig. 6, is a view in elevation of my improved piston valve, and Fig. 7, is a view similar to Fig. 1 showing the valve in closed position.

1, represents a valve casing or body in which a seamless tube 2 preferably of brass is driven or forced, and in surfacing the same, this tube, at its respective ends, is forced into grooves or recesses 3 in the casing or body 1, so as to effectually prevent any longitudinal movement of the tube or bushing, and also prevent any passage of water around the outside of the same. This tube 2 has an inlet opening 4 which registers with the inlet 5 of the casing, and said tube is also provided with a relatively small opening 6, which communicates with a water chamber 7 formed in said casing, and connected by a duct 8 with the inlet 5, for a purpose which will hereinafter appear. On the upper end of the casing 1, a yoke 9 is secured by bolts 10 and nuts 11, and a gasket 12 is interposed between the base of the yoke and the casing, so as to render the juncture steam tight.

13 represents my improved piston valve which is shown in detail in Fig. 6. The larger diameter of this piston valve is of a diameter to snugly fit the interior of tube 2, and slide therein, and this larger diameter is provided with a passage 14 which is adapted to register with the inlet 5 to allow a free passage of the water, or to be moved out of register with said inlet, so as to shut off the passage of water.

Adjacent the largest diameter of the piston, a somewhat smaller diameter 15 is provided around which packing rings 16 are located, and are confined between a shoulder 17 on the piston, and a collar or shield 18 which is adapted to move upon the next smaller diameter 19 of said piston. This diameter 19 is screw-threaded as shown at 20 throughout a portion of its length, and receives tension nuts 21 between which and shield 18, a coiled spring 22 is located, and exerts downward pressure on the shield to expand the packing. The next smaller diameter, and which is the smallest diameter 23 of the piston, projects into the yoke 9, and is hollow and internally screw-threaded in its upper portion as shown at 24 to receive an operating screw 25 hereinafter described.

In the lower portion of yoke 9, packing rings 26 are located around the smallest diameter of said piston valve, and said packing is compressed by a gland 27, which latter is secured by bolts 28 and nuts 29 to the yoke. By adjusting these nuts 29, the gland 27 may be moved to compress the packing and render the juncture with the piston absolutely tight. To prevent any rotary movement of the piston, and hence absolutely insure a perfect alinement between the inlet 5 and the passage 14, a dog or keeper 30 is secured against rotary movement on the smaller diameter of the piston by means of a key 31, and is provided with a recess 32 in one end, movable upon one of the upright members of the yoke, so that said piston is permitted a free vertical movement without any rotary movement.

The screw 25 above referred to has a bearing 33 in the upper end of the yoke 9, and is provided with a flange 34 which engages the inner side of the yoke, and with a hand wheel 36 which engages the outer side of the yoke, so that said screw is held against longitudinal movement. The hand wheel 36 is preferably keyed to the screw as shown at 37, and is securely held in place by means of a nut 38 located on the outer end of the screw.

It will thus be seen that when the hand wheel 36 is turned, screw 25 will be turned, and the piston will be moved longitudinally to open or close the valve.

Fig. 1, illustrates the valve in open position, and the water which passes through the duct 8 into chamber 7, and through opening 6 into the tube 2, exerts a downward pressure on the shield 18 to assist the spring 22 in maintaining a tight packing. This pressure in the chamber 7 and in the tube 2 serves also to create a balance of pressure on both sides of the larger diameter of the piston, which as a matter of fact constitutes the valve proper, so that little resistance is afforded the movement of the piston in closing. With valves such as commonly made, this closing movement is against the boiler pressure, whereas with my improved device, the pressure is equalized on both sides of the valve. After the water is entirely cut off, it will still enter through the opening 6 and assist the spring 22 in holding the packing tight. As soon as the valve begins to open, this balance is maintained, so that the valve may be easily opened. As the valve moves to open position, the water in the chamber will of course, be forced downward and out.

It will be noted that fluid pressure is always maintained on ring 18 whether the valve be closed or open, so that the fluid pressure assists the spring 22 to maintain a tightly packed juncture of the valve with the case and prevent leakage.

While therefore I believe my particular construction of valve to be an improvement in the art, I would have it understood that the features of structure may be varied without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A blow off valve for steam boilers, comprising a casing, a piston valve of two external diameters movable longitudinally in the casing, said larger diameter fitting the casing, and said casing constructed to admit water to both sides of the larger diameter of said valve when open and to one side when closed, substantially as described.

2. A blow off valve for steam boilers, comprising a casing, a piston valve of two external diameters movable longitudinally in the casing, said larger diameter fitting the casing, and said casing constructed to admit water to both sides of the larger diameter of said valve when open, a packing around the smaller diameter of said valve pressing against the end of the larger diameter of the valve, a ring around said valve against the packing and said ring pressed against the packing by the pressure in the boiler when the valve is in both open and closed position, substantially as described.

3. A blow off valve for steam boilers, comprising a casing, a piston valve of two external diameters movable longitudinally in the casing, said larger diameter fitting the casing, and said casing constructed to admit water to both sides of the larger diameter of said valve when open, a packing around the smaller diameter adjacent the larger diameter, a packing around the smaller diameter in the end of the casing, both of said packings compressed when the valve is in both open and closed position, substantially as described.

4. A blow off valve for steam boilers, comprising a casing, a piston valve of two external diameters movable longitudinally in the casing, said larger diameter fitting the casing, and said casing constructed to admit water to both sides of the larger diameter of said valve when open, a packing around the smaller diameter of the valve and located against the end of the larger diameter, a ring around the valve bearing against the packing, a spring bearing against the ring, a nut screwed onto the valve and bearing against the spring, and said ring located in a position to receive the pressure from the inlet to the casing when the valve is in both open and closed position, substantially as described.

5. A valve of the character described, comprising a casing, a piston valve therein, and said casing constructed to admit water to both sides of said valve, whereby a balance of pressure is had during the opening and closing movements of the valve, packing rings around said piston valve, a shield around the piston valve bearing against the packing ring, a spring bearing against the shield, and a nut on the piston bearing against the spring, substantially as described.

6. A valve of the character described, comprising a casing, a tube fixed in the casing and constituting a valve bushing, a piston valve mounted to slide in said bushing, said valve and said bushing having openings registering with an inlet opening in the casing, a water chamber formed in the casing and communicating with said inlet opening, and said tube having an opening therein communicating with said water chamber and permitting the water access to the ends of said piston valve, packing rings around said piston valve, a shield around the piston valve bearing against the packing ring, a spring bearing against the shield, and a nut on the piston bearing against the spring, substantially as described.

7. A valve of the character described, comprising a casing, a piston valve therein, and said casing constructed to admit water to both sides of said valve, whereby a balance of steam pressure is had during the opening and closing movements of the valve, packing rings around said piston valve, a shield around the piston valve bearing against the packing ring, a spring bearing against the shield, a nut on the piston bearing against the spring, a yoke secured on said casing, said piston valve having a hollow reduced diameter extending into the yoke, packing rings around said reduced diameter in the yoke, a gland bearing against said packing rings, bolts and nuts positioning said gland, a dog or keeper secured to said reduced diameter of the piston and having sliding engagement with the yoke, preventing rotary motion of the piston, said hollow piston internally screw-threaded, a screw mounted to turn in the yoke and meshing with the threads in the piston, and a hand wheel secured on the outer end of said screw, substantially as described.

8. A valve of the character described, comprising a casing, a tube fixed in the casing and constituting a valve bushing, a piston valve mounted to slide in said bushing, said valve and said bushing having openings registering with an inlet opening in the casing, a water chamber formed in the casing and communicating with said inlet opening, and said tube having an opening therein communicating with said water chamber, and permitting the water access to the end of said piston valves, packing rings around said piston valve, a shield around the piston valve bearing against the packing ring, a spring bearing against the shield, a nut on the piston bearing against the spring, a yoke secured on said casing, said piston valve having a hollow reduced diameter extending into the yoke, packing rings around said reduced diameter in the yoke, a gland bearing against said packing rings, bolts and nuts positioning said gland, a dog or keeper secured to said reduced diameter of the piston and having sliding engagement with the yoke, preventing rotary motion of the piston, said hollow piston internally screw-threaded, a screw mounted to turn in the yoke and meshing with the threads in the piston, and a hand wheel secured on the outer end of said screw, substantially as described.

9. A blow off valve for steam boilers, comprising a casing, a piston valve of two external diameters movable longitudinally in the casing, said larger diameter fitting the casing, and said casing constructed to admit water to both sides of the larger diameter of said valve when open, said casing having a passage therein maintaining the smaller diameter of said valve in communication with the inlet in both open and closed positions of the valve, substantially as described.

10. A blow off valve for steam boilers, comprising a casing, a piston valve of two external diameters movable longitudinally in the casing, said larger diameter fitting the casing, and said casing constructed to admit water to both sides of the larger diameter of said valve when open, a packing around the smaller diameter of said valve pressing against the end of the larger diameter of the valve, a ring around said valve against the packing and said ring pressed against the packing by the pressure in the boiler when the valve is in closed position, said casing having a passage therein maintaining the smaller diameter of said valve in communication with the inlet in both open and closed positions of the valve, substantially as described.

11. A blow off valve for steam boilers, comprising a casing, a piston valve of two external diameters movable longitudinally in the casing, said larger diameter fitting the casing, and said casing constructed to admit water to both sides of the larger diameter of said valve when open, a packing around the smaller diameter adjacent the larger diameter, a packing around the smaller diameter in the end of the casing, both of said packings compressed when the valve is in closed position, said casing having a passage therein maintaining the smaller diameter of said valve in communication with the inlet in both open and closed positions of the valve, substantially as described.

12. A blow off valve for steam boilers, comprising a casing, a piston valve of two external diameters movable longitudinally in the casing, said larger diameter fitting the casing, and said casing constructed to admit water to both sides of the larger diameter of said valve when open, a packing around the smaller diameter of the valve and located against the end of the larger diameter, a ring around the valve bearing against the packing, a spring bearing against the ring, a nut screwed onto the valve and bearing against the spring, and said ring located in a position to receive the pressure from the inlet to the casing when the valve is in closed position, said casing having a passage therein maintaining the smaller diameter of said valve in communication with the inlet in both open and closed positions of the valve, substantially as described.

13. A blow off valve for steam boilers, comprising a casing, a piston valve in the casing, a packing around the piston valve, and said casing constructed to admit pressure to the packing when the valve is in both open and closed positions, substantially as described.

14. A blow off valve for steam boilers, comprising a casing, a piston valve of two external diameters movable longitudinally in the casing, a packing around the smaller diameter of the valve against one end of the larger diameter, and said casing constructed to admit pressure against the packing when the valve is in both open and closed positions, substantially as described.

In testimony whereof I have signed my name to this specification in the presence of two subscribing witnesses.

JOSEPH F. SCHILLER.

Witnesses:
 R. H. KRENKEL,
 CHAS. E. POTTS.